(12) United States Patent
Chow

(10) Patent No.: US 10,534,829 B2
(45) Date of Patent: *Jan. 14, 2020

(54) TRUST NETWORK EFFECT

(71) Applicant: Edmond K. Chow, Hong Kong (HK)

(72) Inventor: Edmond K. Chow, Hong Kong (HK)

( * ) Notice: Subject to any disclaimer, the term of this patent is extended or adjusted under 35 U.S.C. 154(b) by 69 days.

This patent is subject to a terminal disclaimer.

(21) Appl. No.: 15/795,118

(22) Filed: Oct. 26, 2017

(65) Prior Publication Data

US 2018/0046727 A1 Feb. 15, 2018

Related U.S. Application Data

(63) Continuation of application No. 15/431,761, filed on Feb. 13, 2017, now Pat. No. 9,875,310, which is a continuation of application No. 13/663,366, filed on Oct. 29, 2012, now Pat. No. 9,626,405, which is a continuation-in-part of application No. 13/631,465, filed on Sep. 28, 2012, now Pat. No. 9,015,166, which is a continuation-in-part of application No. 13/615,079, filed on Sep. 13, 2012, now abandoned.

(60) Provisional application No. 61/551,929, filed on Oct. 27, 2011.

(51) Int. Cl.
| | |
|---|---|
| *G06F 16/9535* | (2019.01) |
| *G06F 16/245* | (2019.01) |
| *G06F 16/248* | (2019.01) |
| *G06F 16/2457* | (2019.01) |
| *G06Q 30/02* | (2012.01) |
| *G06Q 50/00* | (2012.01) |

(52) U.S. Cl.
CPC ........ *G06F 16/9535* (2019.01); *G06F 16/245* (2019.01); *G06F 16/248* (2019.01); *G06F 16/24578* (2019.01); *G06Q 30/0263* (2013.01); *G06Q 30/0282* (2013.01); *G06Q 50/01* (2013.01)

(58) Field of Classification Search
CPC ........... G06F 17/30867; G06F 17/3053; G06F 17/30696; G06F 17/30991; G06F 17/30994; G06F 17/3097; G06Q 30/0277; G06Q 30/0242; G06Q 30/0256; G06Q 10/06395; G06Q 50/01
See application file for complete search history.

(56) References Cited

U.S. PATENT DOCUMENTS

| | | | | |
|---|---|---|---|---|
| 7,747,648 | B1 * | 6/2010 | Kraft | G06F 16/288 |
| | | | | 707/790 |
| 7,783,592 | B2 * | 8/2010 | Armstrong | G06Q 10/107 |
| | | | | 715/751 |
| 7,895,177 | B2 | 2/2011 | Wu | |
| 8,055,675 | B2 | 11/2011 | Higgins et al. | |
| 8,180,804 | B1 | 5/2012 | Narayanan et al. | |
| 8,239,364 | B2 | 8/2012 | Wable et al. | |
| 8,539,359 | B2 * | 9/2013 | Rapaport | G06Q 10/10 |
| | | | | 715/751 |
| 8,595,297 | B2 | 11/2013 | Marcucci et al. | |
| 8,601,027 | B2 | 12/2013 | Behforooz et al. | |

(Continued)

*Primary Examiner* — Sargon N Nano

(57) ABSTRACT

An invention is disclosed for systems, methods, processes, and products of providing information to users based on their relationships with other users. Such a system, method, process, or product provides a more reliable, accurate, or otherwise effective way of determining and presenting relevant information to users, consumers, and the like.

20 Claims, 6 Drawing Sheets

(56) References Cited

U.S. PATENT DOCUMENTS

| | | | |
|---|---|---|---|
| 9,244,848 B2 | 1/2016 | Boyd et al. | |
| 2001/0048449 A1* | 12/2001 | Baker | H04L 12/1818 |
| | | | 715/758 |
| 2002/0042725 A1* | 4/2002 | Mayaud | G06F 19/3456 |
| | | | 705/2 |
| 2002/0042726 A1* | 4/2002 | Mayaud | G06F 19/3456 |
| | | | 705/2 |
| 2003/0018624 A1* | 1/2003 | Hsiao | G06F 16/134 |
| 2005/0234891 A1* | 10/2005 | Walther | G06F 16/9558 |
| 2005/0256866 A1 | 11/2005 | Lu et al. | |
| 2007/0060099 A1* | 3/2007 | Ramer | G06Q 30/02 |
| | | | 455/405 |
| 2007/0203887 A1 | 8/2007 | Dynin | |
| 2008/0005064 A1 | 1/2008 | Sarukkai et al. | |
| 2008/0133495 A1 | 6/2008 | Fischer | |
| 2009/0024631 A1* | 1/2009 | Monahan | G06Q 30/0222 |
| 2009/0063247 A1* | 3/2009 | Burgess | G06Q 30/02 |
| | | | 705/7.34 |
| 2012/0089698 A1 | 4/2012 | Tseng | |
| 2012/0110474 A1 | 5/2012 | Chen et al. | |
| 2012/0143843 A1* | 6/2012 | Smyth | G06F 16/9535 |
| | | | 707/707 |
| 2015/0006522 A1 | 1/2015 | Dai et al. | |
| 2015/0073986 A1* | 3/2015 | Kligman | G06Q 20/0425 |
| | | | 705/44 |

* cited by examiner

Current Offers (Trust Effect OFF):

Sorted by Time (most recent first): Offer(T12, S2, U2), Offer(T11, S1, U3), Offer(T10, S3, U3), Offer(T6, S4, U3)

Sorted by Price (cheapest first): Offer(T10, S3, U3) = $3, Offer(T11, S1, U3) = $4, Offer(T12, S2, U2) = $5, Offer(T6, S4, U3) = $6

Current Offers (Trust Effect ON):

Sorted by Time (most recent first): Offer(T12, S2, U2), Offer(T9, S1, U1), Offer(T4, S3, U2)

Sorted by Price (cheapest first): Offer(T12, S2, U2) = $5, Offer(T4, S3, U2) = $6, Offer(T9, S1, U1) = $7

TRUST NETWORK EFFECT

CROSS-REFERENCES TO RELATED APPLICATIONS

The present application is a continuation of U.S. application Ser. No. 15/431,761, filed Feb. 13, 2017 and entitled "Trust Network Effect," which is a continuation of U.S. application Ser. No. 13/663,366, filed Oct. 29, 2012 and entitled "Trust Network Effect" (issued as U.S. Pat. No. 9,626,405 on Apr. 18, 2017), which claims benefit under 35 U.S.C. § 119(e) of U.S. provisional patent application No. 61/551,929, filed Oct. 27, 2011, and which is a continuation-in-part of U.S. application Ser. No. 13/631,465, filed Sep. 28, 2012 (issued as U.S. Pat. No. 9,015,166 on Apr. 21, 2015), which is a continuation-in-part of U.S. application Ser. No. 13/615,079, filed Sep. 13, 2012. The content of each of the above applications is incorporated herein by reference in its entirety.

TECHNICAL FIELD

The present invention relates to systems, methods, processes, and products of providing recommendations to consumers in relation to a subject matter. In particular, embodiments of the present invention provide peer-to-peer recommendations in a social network or a search service.

BACKGROUND

There are systems that enable consumers to post entries or digital resources about a particular subject matter, such as retail offers, sellers and items. Some of these systems also allow users to sort or filter these entries or digital resources based on attributes of the subject matter to which the entries or digital resources pertain, such as price and distance for retail offer entries. Since user-generated entries or digital resources may contain wrong information, intentional or otherwise, system administrators or providers may review the posts or submissions before making them available to other members or users in the system. However, such manual intervention is not scalable to large volume of posts or submissions, and may impact adversely the timely availability of the posts or submissions. A system may allow users to rate entries so that the entries may be sorted or filtered based on such ratings, so to improve the relevancy of entries to the users. However, according to one study, many top user reviewers are given incentives to provide reviews, and many of these user reviewers might have provided positive reviews due to such incentives. And it is generally taken that only a small portion of consumers would provide ratings, especially when there is no need to voice any complaint, thereby under-reporting otherwise satisfactory goods or services, for instance. Meanwhile, a small group of proactive users can game the system by providing positive ratings to boost up the visibility of entries pertaining to items that they have vested interests in.

SUMMARY

According to one embodiment, a method is provided for accepting a plurality of posts (or entries or digital resources) for a subject matter from a plurality of users in a system. Each user is associated with a user account in the system, and each post is associated with a relationship score maintained in the system. One or more of the posts are presented to one or more of the users, such as in response to a user query or request relative to the subject matter, a notification in connection with some prior user registration, or unsolicited content in part of electronic communication. For each of these posts, it is determined if the one or more users have established a positive relationship with the post, where they had no prior positive relationships with the post before. If there are such new positive relationships, the relationship score of the post is incremented for each new positive relationship. An ordered list of posts including at least one of the one or more posts is generated based at least in part on the relationship score of the one or more posts. According to one embodiment, the relationship score is displayed along with each of the post in the ordered list. According to another embodiment, the relationship score is one of the criteria for sort order of the ordered list. The criteria include time, distance range, location, and price range. According to yet another embodiment, the timestamp of the positive relationship between a user and a post may be updated when the user performs an activity that renews or reinforces their existing positive relationship.

According to one embodiment, only operational relationships will constitute a positive relationship between a user and an entry or digital resource. Activities that may constitute an operational relationship between an entry or digital resource and a user include but not limited to: the user submitting the entry or digital resource, submitting another entry or digital resource adding to, referring to, or including the entry or digital resource, the user purchasing the entity associated with the entry or digital resource, the user requesting information in connection with the entry or digital resource, and the user forwarding the entry or digital resource, or a reference to it, to another user. Activities that may constitute a non-operational relationship between an entry or digital resource and a user include but not limited to: the user submitting a rating for the entry or digital resource, and the user bookmarking the entry or digital resource, or marking it as favorite. According to another embodiment, a positive relationship may include user ratings only if the ratings are not negative. According to yet another embodiment, a positive relationship may be removed when a certain period of time has expired since the latest positive relationship establishment between a user and an entry or digital resource, or when there is deemed a negative relationship between the user and the entry or digital resource, such as a negative review against the entry or digital resource by the user.

According to another embodiment, a method is provided for presenting one or more digital resources to a user in relation in a request, interest, or subject matter, the method comprising: associating one or more participants with a user; accepting a plurality of digital resources; receiving a request from the user, the request relative to a subject matter; identifying a subset of the digital resources based at least in part on the request; determining one or more relationships between the subset of the digital resources and the one or more participants; and presenting the subset of the digital resources to the user based at least in part on the one or more relationships.

According to other embodiments, the method's accepting the plurality of digital resources may include receiving the plurality of digital resources from the one or more participants, and storing in a database the plurality of digital resources. The one or more participants may include the user, information providers and other users. The one or more relationships may include relationships between activities relative to the subset of the digital resources, and the one or more participants performing the activities. The activities may include reviews, recommendations, or updates. The digital resources may include references to the digital resources, the references including URLs (Uniform Resource Locators) and URNs (Uniform Resource Names). The one or more digital resources may include entries in an ordered list of digital resources. The method's presenting the subset of the digital resources to the user based at least in part on the one or more relationships may comprises: ignoring entries in the ordered list of digital resources based at least in part on the one or more relationships; and presenting the ordered list of digital resources to the user, wherein each entry in the ordered list of digital resources is not ignored.

According to one embodiment, the method may further comprise determining the ordered list of digital resources based in least in part on a score, wherein the score includes a relevance score or a ranking. Each of the one or more digital resources may include location information, and the one or more digital resources may include a list of digital resources, ordered by the location information in relation to a location reference. The location information may include distances or GPS coordinates. The location reference may include the position selected by the user, or the position of a device coupled to the user.

According to another embodiment, each of the one or more digital resources may include time information, and the one or more digital resources may include a list of digital resources, ordered by the time information. The method's presenting the subset of the digital resources may comprise: ignoring entries in the ordered list of digital resources based at least in part on the one or more relationships; and presenting the latest entry in the ordered list of digital resources, wherein the latest entry is not ignored. According to one embodiment, the one or more digital resources may include offer entries, each comprising item information, seller information, and price information.

According to yet another embodiment, a non-transitory computer-readable storage medium bears computer-readable instructions that, when executed on a computer, cause the computer to: associate a participant with a user; associate a setting with the user, receive a request from the user; determine a first set of digital resources and a second set of digital resources based on the request; determine that the first set of digital resources is not associated with the participant; and present a third set of digital resources to the user based on the second set of digital resources. In addition, the first set of digital resources and the second set of digital resources may comprise entries, each entry being associated with an entity, and a first attribute associated with the entity, and a second attribute associated with the entity, the entity including an offer from a particular seller for a retail item, the first attribute including a submission time, and the second attribute including a price. The non-transitory computer-readable storage medium bears computer-readable instructions may also cause the computer to: select for each entity in the second set of digital resources an entry, the entry whose first attribute is associated with a value deemed more relevant than values being associated with first attributes of other entries, the other entries being associated with the entity; generate a list of digital resources based on the selected entries, the list of digital resources being sorted based on the second attribute; and present the list of digital resources to the user.

Objects and Advantages

An embodiment of the present invention promotes or otherwise selects subject-matter entries or digital resources based on their relationships with members in a social network without the need of the members to explicitly rate or review the entries or digital resources, while taking into account such ratings or reviews if available. Such relationships include operations that a member may have performed on, for, or with the entries or digital resources. For example, a member may use a seller entry to compose an offer entry, thereby establishing a relationship between the member and the seller entry for the purpose of contributing to the visibility of the seller entry to other members, without the seller entry receiving explicitly a positive rating from the member. Another embodiment promotes or otherwise selects subject-matter entries based on their relationships with select members or groups of members relative to a member. Yet another embodiment replaces a list of entries with another list based on attribute values of those entries so promoted or otherwise selected for inclusion on the other list, both the list and the other list being sorted per some subject-matter attribute(s), thereby generating a more reliable ordered list of entries (i.e., the other list).

DETAILED DESCRIPTION OF ILLUSTRATIVE EMBODIMENTS

Figure 1:
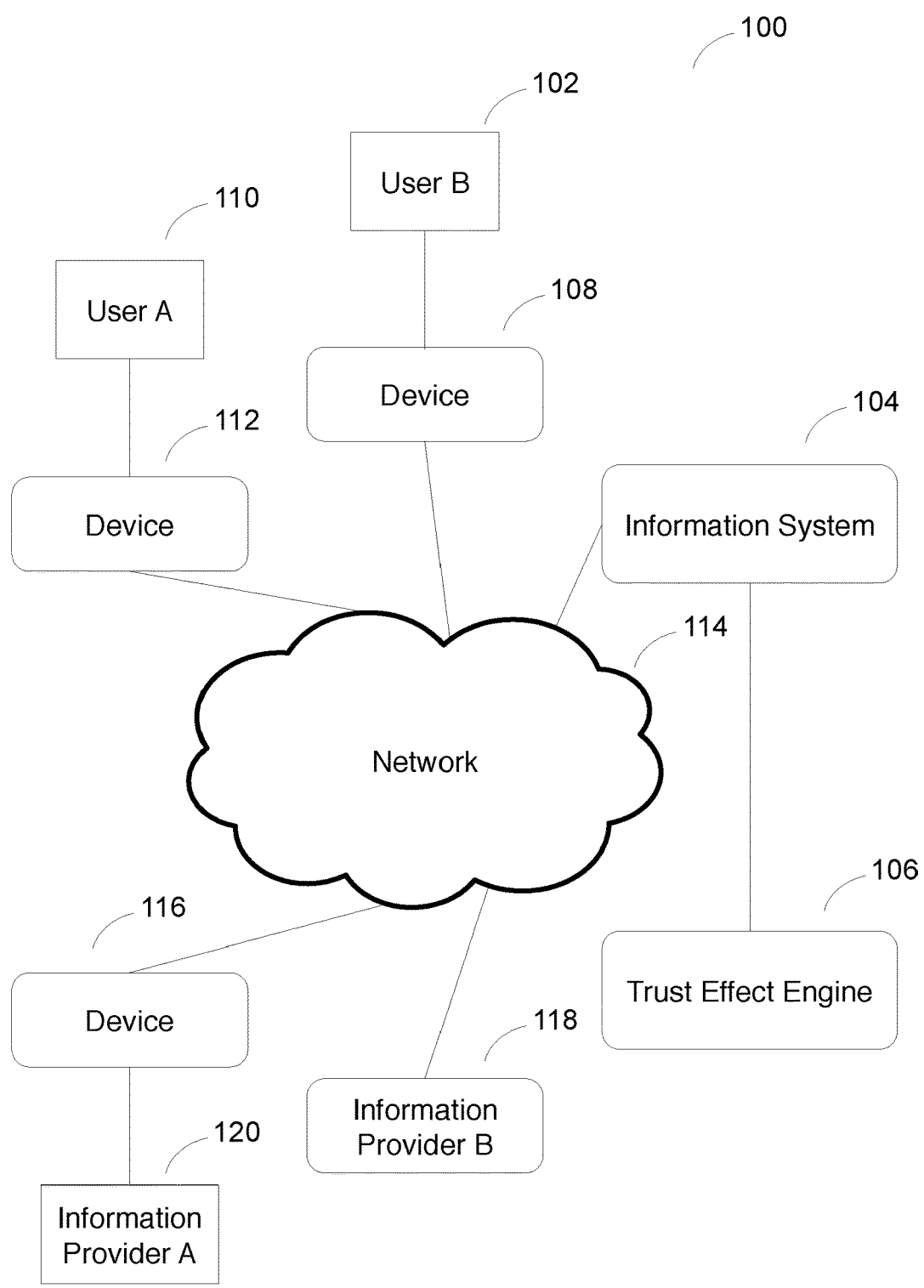
FIG. 1 illustrates an example environment for an embodiment of the present invention.

Disclosed are methods, systems, processes, and products for presenting information to or for a user in an environment based at least in part on the user's relationships with other participants in the environment. For instance, a method for presenting one or more digital resources (herein also referred to as entries) in relation to a request, interest or subject matter to or for a user in a system is described. Such a method may associate in a system one or more participants with a user, where the one or more participants may or may not include the user. The one or more participants may include information providers (e.g., authors, publishers, reporters, news agencies, websites, and so on), and other users. The method may accept in the system a plurality of entries, such as storing in a database the entries and identification of sources of the entries. Such an entry may include or be a reference to a digital resource (e.g., URLs—Uniform Resource Locators), and such a source of an entry may include or be URLs, URNs (Uniform Resource Names), and user IDs. The method may then receive in the system a request from the user, where the request may include a text, image, audio, and so on, and may be associated with a subject matter. The method may identify one or more of the entries based at least in part on the request (e.g., search results in response to a query), and determine one or more relationships between the one or more of the entries and the one or more participants. The method may establish or otherwise determine such a relationship based on identification of users (e.g., user IDs) being associated with the entries, identification of the entries (e.g., URLs) being associated with users, data or metadata relating users to entries (and vice versa). Such data or metadata may include the request, or part thereof; they may include a score, rank, flag, marker, indicator, or value; a vector of scores, ranks, flags, markers, indicators, or values; and a matrix of scores, ranks, flags, markers, indicators, or values. The method may then present the one or more of the entries to the user based at least in part on the one or more relationships. In another embodiment, a computer system equipped with the present invention may associate a set of participants with a user, receive a request from the user about a subject matter, determine a plurality of digital resources based on the request, determining that a relationship exists between a member of the plurality of digital resources and the set of participants, and then present a set of digital resources to the user based on the relationship, wherein the set of digital resources may comprise the member of the plurality of the digital resources.

The set of participants or the one or more participants may comprise the user, members, or information providers in or via other systems. The user may be associated with a multiple groups of participants, where each group as a whole may also be regarded as an individual participant. A Trust Network herein refers to a collection, group, or set of participants or a membership in or via one or more systems whose activities and/or behavior in the systems may affect entries that the one or more systems may present to a user, for example, in response to his query or request. The activities or behavior may include (but not limited to) a submission, review, rating, and usage of entries in the systems. The user may be associated with more than one Trust Network. More than one user may collectively be associated with one or more Trust Networks. Accepting one or more entries in a system equipped with the present invention may include acquiring one or more entries from users in the system, or from automated means such as Web crawling. Such accepting may also include indexing the one or more entries. Storing one or more entries may include indexing the entries in accordance to some criteria or parameters, the criteria or parameters including identification of one or more users in the system having an association or relationship, if any, with each of the entries. Such an association or relationship may include a submission, usage, review, or rating relationship. In one embodiment, such an association or relationship may assume different degrees or levels of relevancy or importance. For example, repeated usage of an entry by a user or the duration of an entry on a user's favorite or bookmark list may constitute a higher degree or level of relationship between the entry and the user. In another embodiment, such a relationship may also be characterized as positive, negative, non-positive, non-negative, or neutral. For example, a user providing a negative rating or a rating below a certain threshold against an entry may constitute a negative relationship between the entry and the user. In an embodiment, a neutral or positive relationship may cause the entry in question to be considered for presentation or comparison, whereas a negative relationship may cause the entry to be omitted or ignored even though the entry may have been deemed relevant to the user request in question. In yet another embodiment, a relationship between an entry and a user may change over time, for example, from existent (e.g., on the user's bookmark list) to non-existent (e.g., off the user's bookmark list), and then back to existent (e.g., the user's bookmarking the entry again), or from positive (e.g., the user's associating a positive rating with the entry) to negative (e.g., the user's associating a negative rating with the entry).

A source of the entries may include identification of users that provide or otherwise make available the entries in the system. The subject matter may include a retail offer, a collection of offers, a news item, a collection of news items, an event, a collection of events, an announcement, a collection of announcements, and so on. A request from the user may include a user-provided query, a system-generated query, or a combination thereof. In one embodiment, such a request may also include an indication to activate a step of determining of one or more relationships between the entries and the participants, and a step of presenting the one or more of the entries to the user based at least in part on the one or more relationships, so to replace a step of presenting the one or more of the entries to the user based at least in part on the request. In another embodiment, such an indication may be received additionally before or after the request, or independently from the request. In yet another embodiment, a request from the user may include an indication to reverse or switch between these two processes. Such an effect or impact on the presentation to a user of the one or more entries based at least in part on the one or more relationships between the one or more of the entries and a set of participants, and/or between the user and a set of participants, is herein referred to as Trust Network Effect™, or simply Trust Effect™.

In an information system, such as a search engine or social network, a multitude of digital resources or discrete information units (e.g., webpages, news items, retail offers, performance show times, photos, songs, videos), herein also referred to as entries, are available to users whose one of the primary challenges is to discover, receive, or otherwise access relevant entries as quickly as possible. In response or relation to a user's query or interest for information, an information system equipped with the present invention may, for instance, be capable of selecting for presentation entries based at least in part on relationships between the entries and one or more participants in the system, and/or between the user and one or more participants in the system. In one embodiment, a relationship between a user and a digital resource may be established or otherwise construed based on a submission, usage, review, or rating by the user in relation to the digital resource. A relationship between a user and another user, or between a user and a participant in a system, may be established or otherwise indicated statically by the user, participant, or the system. In another embodiment, such a relationship may be established or otherwise determined dynamically by the system, for example, based on users' identity visibility, logon statuses, privacy settings, trustworthiness scores, and so on.

The one or more participants whose association with a user may be considered as part of the selection criteria of entries in relation to the user's request or interest may be regarded as member of a Trust Network for the user in question. Such capability or functionality may also be referred to as Trust Network Effect, or simply Trust Effect. More than one user may share the same Trust Network, while a user may be associated with more than one Trust Network. The user or system may choose a subset of multiple Trust Networks or individual members in a Trust Network for consideration of Trust Effect, whether individually (e.g., the logical OR relationship) or as a series or union of criteria (e.g., the logical AND relationship). The one or more participants may include users in the information system, as well as providers of information to the system. According to an embodiment, a Trust Network for a given user may not include the given user. The membership in a Trust Network may be explicitly stated or otherwise indicated by the user or his group to which the Trust Network is applicable. Or it may be established, dynamically or otherwise, via the user's direct or indirect associations or affiliations with other users or groups. One or more of these other users or groups may make up a Trust Network. Any manner or type of association in creating or constituting a Trust Network is within the scope of various embodiments. For instance, in one embodiment, a user may be deemed being associated with another user when the other user has configured his account to follow the activities or submissions of the user, or to mark the user as his favorite. In another embodiment, all users whose identities are known (e.g., via logon) to the system or the users may by system default belong to a Trust Network with respect to each other, whereas users whose identities are not known (e.g., a user of the system without logging on) are considered outside the Trust Network.

In some embodiments, entries are related by time or space to one another for or via a subject matter. For example, prices for an item at a seller may represent individual entries, where the item and/or price availability at the specific seller may be regarded as the subject matter. Each price entry may also be an update to an older price entry for the same item at the same seller. Sellers available in a given geographical area (whether for a particular item or not) may be related to one another in reference to a geographical point or center in the area. Their corresponding entries may then be compared or otherwise presented in accordance to their locations. In this case, the subject matter of these seller entries may be that of available sellers in the given geographical area. Likewise, entries for parties, shows, or performances available in a given city may also be related to one another by distance to a point of geographical reference, by start time, or by ticket price. Entries for events or news in a country (or organization), of a specific interest (e.g., science and technology), or for a celebrity, may be related by time. Some embodiments may remove, suppress, or otherwise omit entries for presentation or comparison that may have otherwise been included for such operation if without consideration of associations or relationships between users in a system and their associated or related Trust Networks. Some other embodiments may add or otherwise include entries for presentation or comparison that may have otherwise been omitted if without consideration of such associations or relationships.

FIG. 1 illustrates an exemplary environment 100 for presenting digital resources or entries to a user with consideration to his Trust Network(s). User A 110, user B 102, information provider A 120, and information provider B 118 are communicatively coupled to an information system 104 via a network 114, and are participants in the system. As depicted, information provider A 120 is connected to network 114 via device 116. Information providers such as information providers A 120 and B 118 may be sources of digital resources or entries available in or via the information system. Users such as users A 110 and B 102 may be consumers of these resources or entries. For example, they may search, request, or otherwise retrieve entries (including references to entries) from the information system 104. In some embodiments, users may also submit or otherwise contribute to the information or database (not shown) available through or maintained by the system. They may therefore be regarded as information providers. Users and information providers (esp. human ones) often use a device, e.g., a mobile phone, tablet computer, desktop computer, (such as device 108 or 112), for access or communication to an information system (such as the information system 104), while machine users (not shown) and information providers (e.g., information provider B 118) may communicate directly with the information system without such an intermediary. According to one embodiment, the information system 104 may interact with a plurality of users at their device via a website or an application running on the device. Entries or references to entries (e.g., URLs, which may also be considered as entries themselves) may be created or edited via the information system 104, or submitted or otherwise transmitted individually or as a batch to the system 104 via the network 114. According to some embodiments, a user associated with a device (e.g., users A 110 and B 102) may submit an entry to the information system 104. An example entry is an offer entry, which may comprise information for an item, seller and price. The information system 104 may also accept or retrieve information for an entry (e.g., an offer or offer entry) from information providers (e.g., information providers A 120 and B 118).

A trust effect engine 106 is coupled to the information system 104. The trust effect engine 106 may process entries in relation to Trust Networks for a user or a group of users who may share the same Trust Networks or their equivalents. It may manage the Trust Networks and determine direct or indirect relationships, if any, between the entries and the Trust Networks. It may revise, advise, or otherwise cause in relation to these relationships the selection of entries for presentation to the user or group of users in question. For example, the information system 104 may present to a user via his associated device an entry older than another entry for the same subject matter in response to his request for the latest entry for the subject matter, if a Trust Effect setting, or something similar or equivalent, is enabled for the user in general or for this particular request, and the information provider of the entry is a member of the user's Trust Network whereas the information provider of the other (albeit more recent) entry is not. The trust effect engine 106 may also cause the information system 104 to remove, suppress, omit, or otherwise downgrade for presentation some entries against a subject matter (e.g., updates to an event or opinions to a topic) that lack relationships with a user's Trust Networks. According to one embodiment, the trust effect engine 106 may comprise a module associated with the information system 104. According to another embodiment, an entry may be deemed relevant to a user's request only if a minimum number of distinct members in the user's Trust Network have a positive, relevant or applicable relationship, direct or indirect, with the entry. Such positive, relevant or applicable relationships include (but not limited to) a positive rating for the entry, or usage of the entry for a request or as part of another entry that these members may make or submit.

In one embodiment, user A 110 may indicate to the information system 104 that user B 102 is his friend or favorite. As a result, the information system 104 (or the trust effect engine 106 coupled to the information system 104) adds user B 102 to user A's Trust Network. User A 110 may also explicitly mark user B 102 as trusted, thereby adding user B 102 to his Trust Network, even when user B 102 is neither his friend nor favorite. (The information system 104 may provide an option for User B 102 to opt out of being a member of user A's Trust Network.) After user B submits an offer entry for item ABC (not shown) available at seller XYZ (not shown), another user (not shown) submits an offer entry for the same item and seller, thereby updating the price information for item ABC available at seller XYZ. With the Trust Effect setting (or herein simply Trust Effect) enabled by or for user A (on a per request basis, or an on on-going basis) thereby engaging the trust effect engine 106 or metadata (e.g., attributes in indexes of offer entries in the system) that the trust effect engine 106 may produce or otherwise contribute, the information system 104 may be configured to present to user A 110 the offer entry submitted by user B 102 as the current offer for item ABC at seller XYZ instead of the one submitted by the other user, if the other user is not a member of user A's Trust Network in effect or consideration. That is, without Trust Effect enabled, when user A searches or otherwise requests the current offer information for item ABC, the information system may present him via his associated device the offer information (e.g., the price) as submitted by the other user when seller XYZ or its latest offer is deemed relevant to user A's search or request (e.g., within a price or distance range, or in certain locations).

Figure 2:
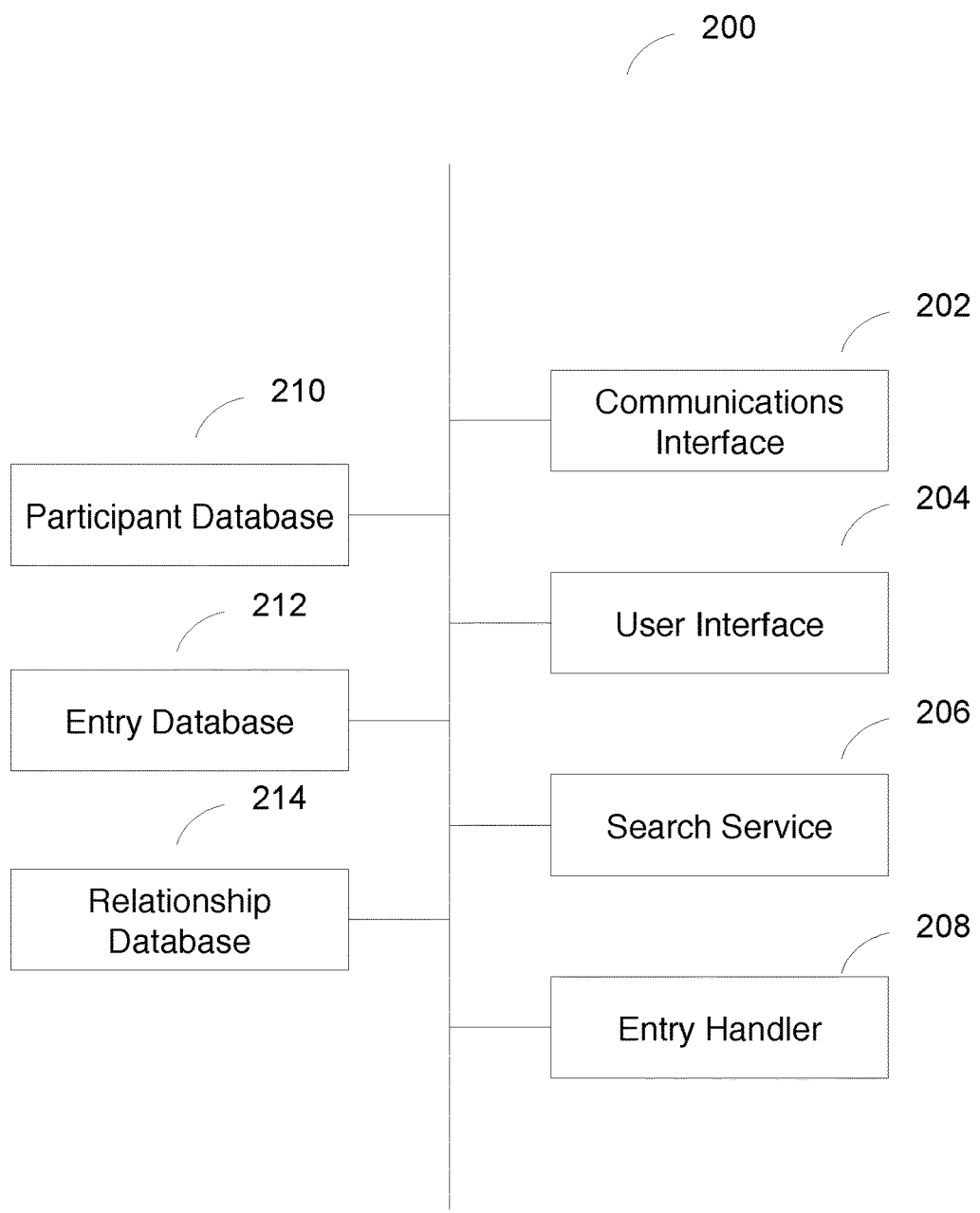
FIG. 2 illustrates an example block diagram for an information system in accordance with an embodiment of the present invention.

FIG. 2 shows a block diagram of an exemplary information system 200, such as the information system 104 shown in FIG. 1. A communications interface 202 is provided for communicating with devices, information providers, and users over a network, such as user A 110, information provider A 120, and the devices 112 and 108 shown in FIG. 1. Through the communications interface 202, entries may be retrieved from (e.g., Web crawling) or submitted by information providers, and requests for entries may be received from users. Other types of data or directives, e.g., a Trust Effect setting for individual requests or users, may also be transmitted via the communication interface 202. Any type of communications interface is within the scope of various embodiments.

A user interface 204 is provided for interacting with users and their coupled or associated devices, and it may include the logic or procedures for user identification or authentication, submission of requests and entries (or references to entries), management of user data, and presentation of entries. Any layout, format, mode (e.g., audio), policy, scheme, or rules pertaining to these activities including but not limited to submission, creation, acquisition, selection, and presentation of entries and related data or metadata such as entry dates, identification of information providers and users, trust network relationships and the like are within the scope of various embodiments.

A search service 206 (or engine or module) is provided for maintaining (such as indexing entries) and searching (such as accepting queries from users) data and metadata available in or via the information system 200, such as those pertaining to various entities such as information providers, users, entries, relationships, and so on. Data and metadata (e.g., indexes of the entities available in or via the system) may be stored and maintained in databases for entities of interest (e.g., participant database 210, entry database 212, and relationship database 214), or some other databases (not shown). For example, a participant database 210 may be divided into an information provider database (not shown) and a user database (not shown). The search service 206 may interact with the trust effect engine 106 for further processing of its selection of entries, for example, in response to a user's query or request.

An entry handler 208 is provided for processing and retrieving entries from information providers (including users), as well as for interacting with users when they create or edit entries via their coupled or associated device. It may cause the search service 206 to store entries and related data and metadata in their respective databases or some other databases. According to one embodiment, the storing may include indexing the entries, or interacting with the trust effect engine 106, for example, to cause the trust effect engine 106 to determine relationships between the entries and Trust Networks that the information system 200 may maintain and to update such relationships in databases.

A relationship database 214 is provided for storing relationships among entities available at or via the information system 200, including but not limited to relationships between entries and participants such as information providers and users, those between entries and users' requests, those among users (e.g., following and followed), those between users and user categories (e.g., qualification for participation in Trust Networks), and those between entries and Trust Networks. Example relationships include memberships of information providers in users' Trust Networks, and submissions, usages or recommendations of entries by information providers. Any type of inter-entity type relationship is within the scope of various embodiments for the relationship database 214. Intra-entity type relationships may also be stored in the relationship database 214, their respective entity-type databases (not shown), or some other databases (not shown).

An entry database 212 is provided for storing entries and/or references to entries including identification of their sources (e.g., information providers), as well as other related data or metadata (e.g., submission time, cached copies of entries, tags, keywords). Relationships among entries (or their equivalent data or metadata) may also be stored in the entry database 212. For instance, entries may be related to one another by subject matter, time or geographical space or distance. According to one embodiment, the search service 206 may retrieve a plurality of entries against some relationship criteria with respect to the entries in the entry database 212. For example, for a database of offer entries or offers, the search service 206 may obtain the latest price information for an item for a particular quantity at a specific seller, the historical price information for the same item for the same quantity at the same seller, or all current offers for the same item from sellers within some geographical designation, distance, or perimeters.

A participant database 210 is provided for storing information about participants (including information providers and users) in the information system 200. There may be different types of categories of participants and the information pertaining to each type may differ. For instance, a user record in the participant database 210 may comprise an identifier, display name, logon credential, and so on. An information provider record may comprise an identifier, display name, location, logon credential, entry retrieval policies, and so on.

Although the information system 200 is described as being comprised of various components (the communications interface 202, user interface 204, search service 206, entry handler 208, relationship database 214, entry database 212, and participant database 210), fewer or more components may comprise the information system 200, or the information system 104 shown in FIG. 1, and still fall within the scope of various embodiments. For instance, the search service 206 may include modules, components or functions for or equivalent to the entry handler 208. The search service 206 or entry handler 208 may include modules, components or functions for or equivalent to the trust effect engine 106 coupled to the information system 104 shown in FIG. 1.

Figure 3:
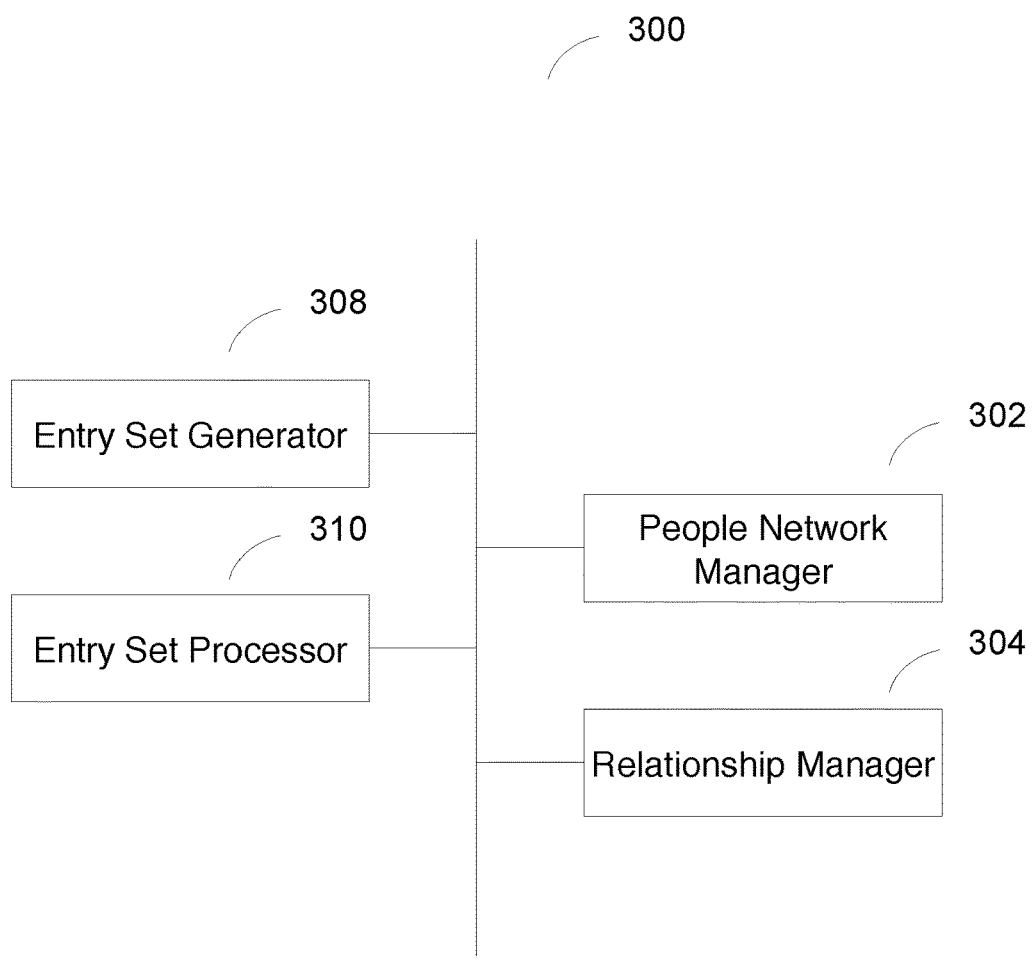
FIG. 3 illustrates an example block diagram for a trust effect engine in accordance with an embodiment of the present invention.

FIG. 3 shows a block diagram of an exemplary embodiment of a trust effect engine 300, such as the trust effect engine 106 shown in FIG. 1. The trust effect engine 300 comprises a people network manager 302, relationship manager 304, entry set processor 310, and entry set generator 308.

The people network manager 302 is provided for establishing, maintaining, and accessing membership information in a Trust Network for a user or group of users stored in the participant database 210. Such membership information may be created explicitly by the user (e.g., via the user interface), or by his association with other users, such as their being his friends or favorites. (Such membership information, associations, or relationships may be stored in the relationship database 214.) The people network manager 302 may receive requests and/or notifications from components in the information system 104, or otherwise monitor their activities so to create, update and destroy Trust Networks accordingly.

The relationship manager 304 is provided for establishing and maintaining relationships stored in the relationship database 214 or its equivalent, such as those between entries stored in the entry database 212 and Trust Networks maintained in or otherwise derivable from the relationship database 214. Such relationships may include (but not limited to) submission, usage, reference, review, or rating relationships between entries and members in Trust Networks. For example, a member in a Trust Network may use an existing item entry to construct a new offer entry before submitting the latter to the information system 104. This may be regarded as a relevant, applicable or positive relationship (e.g., of usage) between the item entry and the Trust Network in question. Such relationships may be stored in the relationship database 214, or entry database 212 (e.g., in fields that are part of an index of entries in the entry database 212). Alternatively, the relationship manager 304 may provide the relevant relationship information directly to the entry set processor 310 upon request or on demand.

The entry set processor 310 is provided for determining what entries in a set of entries, and/or other entries related to the set, as provided by the search service 206 (e.g., in response to a user's query or chosen interest) should be selected, included, or otherwise promoted in relation to relationships, if any, for example, between the entries in the set and a Trust Network in question, or otherwise establishing data or metadata for the same (e.g., in the entry database 212, relationship database 214, and/or some other databases (not shown)). Such relationships may include submission, usage, reference, review, or rating relationships between entries and members in the Trust Network, or any relationship types such as those described earlier, as may be determined by the relationship manager 304. According to some embodiments, the size of the set of entries may be bounded so that entries that may otherwise be deemed relevant by the search service 206 for the user or his request, but excluded from the set of entries due to this size limit, would not be considered by the entry set processor 310 in its determination of relevancy of entries in relation to the user's Trust Network for the user or his request.

The entry set generator 308 is provided for generating an entry set based at least in part on the entries so selected, included or otherwise promoted by the entry set processor 310. The entry set generator 308 may, for instance, apply to these entries some presentation rules or criteria associated with or otherwise intended for the original, initial, or input entry set as received or otherwise worked on by the entry set processor 310. For example, the entry set processor 310 may receive a set of current offer entries at various sellers from the search service 206 whose intent or criterion is to order the offer entries by time or distance for selection or presentation. The entry set processor 310 may replace some of the current offer entries with older ones for the same sellers given the latter are provided by members in a Trust Network in question, and remove a few offer entries because none of the offer entries for their corresponding sellers is provided by any member in the Trust Network. The entry set generator 308 may therefore apply or re-apply the time or distance ordering to the resultant set of entries as provided by the entry set processor 310. In this case, for instance, the search service 206 may then select the top ten entries from the resultant set and present them as initial results to the user via his coupled device. In some embodiments, the entry set generator 308 may be configured to select and present entries to users via the user interface 204.

Although the trust effect engine 300 is described as being comprised of various components (the people network manager 302, relationship manager 304, entry set processor 310, and entry set generator 308), fewer or more components may comprise the trust effect engine 300 or the trust effect engine 106 shown in FIG. 1, and still fall within the scope of various embodiments. For instance, the people network manager 302 and the relationship manager 304 may be combined into a single functional component, while the entry set processor 310 and the entry set generator 308 may be combined into another one. The entry set processor 310 may be configured to provide the function or module for or equivalent to the relationship manager 304. According to some embodiments, the entry set generator 308 may be optional. In addition, any of these components of the trust effect engine 300 may be incorporated into the information system 200, and the components of the information system 200 may assume the role or function of any of these components of the trust effect engine 300. That is, the trust effect engine 300 or its functions or components may be embedded into the information system 200, or its entire functionality be realized as part of the search service 206 or distributed into the various components in the information system 200. For example, the search service 206 may provide the function or module for or equivalent to the entry set processor 310 and/or entry set generator 308, while the user interface 204 may provide the function or module for or equivalent to the people network manager 302 and/or relationship manager 304.

Figure 4:
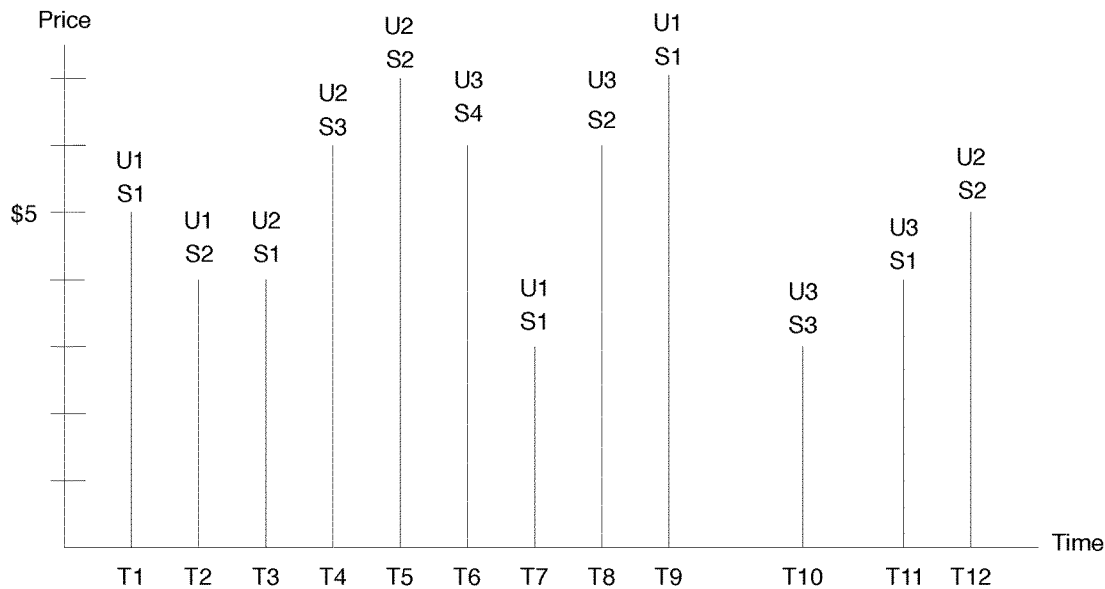
FIG. 4 provides an illustration for an example system, process, or product result in accordance with an embodiment of the present invention.

FIG. 4 provides an illustration 400 of an operational effect by an embodiment (a method, system, process, or product) in an exemplary environment (such as the environment 100 shown in FIG. 1). In relation to this illustration, there are three users (namely, U1, U2, and U3) and four sellers (namely S1, S2, S3, and S4). The embodiment, which may be an offer repository system (not shown) equipped with the present invention, may comprise both an information system (such as the information system 200 shown in FIG. 2) and a trust effect engine (such as the trust effect engine 300 shown in FIG. 3). It may identify and interact with these users or their coupled devices via the user interface 204. Such identification, among many options or mechanisms in the art, may be based on prior user authentication using logon credentials stored in the participant database 210.

Via the user interface 204, U1 identifies U2 as his friend in the system, thereby causing the people network manager 302 to add U2 to U1's Trust Network, and store this association or membership in the relationship database 214. For this particular embodiment, a user is by default also a member of his own Trust Network (e.g., U1 is a member of U1's Trust Network).

The entry handler 208 receives via the user interface 204 or communications interface 202 a plurality of offer submissions for a particular item. Over time, these users have together submitted or sent twelve offer submissions for the item available at the various sellers, as illustrated in FIG. 4. For each offer submission, the entry handler 208 creates an offer entry in the entry database 212, along with identification of its submitter or provider. Each offer entry comprises a time (i.e., one of the 12 submission times, namely T1 to T12), seller information or its identification (i.e., for one of 4 sellers, namely S1 to S4), and price information (e.g., currency and amount). The submitter or provider information (i.e., for U1 to U3) may be stored as part of the offer entry, or as separate data associated with the offer entry in question.

Then U1 or his coupled device sends the system via the communications interface 202 a query for the current offer information in relation to the item. The user interface 204 receives the request and directs it to the search service 206. By default or configuration in the system, Trust Effect for U1 is disabled. As such, the search service 206 retrieves from the entry database 212 the offer entries representing the current offers at the four sellers, namely: offer of $4 at time T11 for seller S1 as submitted by user U3 (i.e., Offer(T11, S1, U3)=$4), offer of $5 at T12 for S2 by U2 (i.e., Offer(T12, S2, U2)=$5), offer of $3 at T10 for S3 by U3 (i.e., Offer(T10, S3, U3)=$3), and offer of $6 at T6 for S4 by U3 (i.e., Offer(T6, S4, U3)=$6), and returns them to the user or his device via the user interface 204 or directly via the communications interface 202. Either by the system's preference or upon U1's request, the search results may also be ordered by time (e.g., the most recent first) or price (e.g., the lowest price first). In this case, the result list may be as follows: if sorted by time (most recent first): Offer(T12, S2, U2), Offer(T11, S1, U3), Offer(T10, S3, U3), Offer(T6, S4, U3); if sorted by price (cheapest first): Offer(T10, S3, U3)=$3, Offer(T11, S1, U3)=$4, Offer(T12, S2, U2)=$5, Offer(T6, S4, U3)=$6. This scenario is depicted in FIG. 4.

With Trust Effect turned on for U1 (e.g., as part of his query request, a user profile setting stored in the participant database 210, or as determined by any component in the information system 200 and/or trust effect engine 300), a query from the user for current offers in the system would cause the search service 206 to invoke the entry set processor 310 to select entries from either the entry database 212 and/or directly from the search service 206 in accordance to their relationships with U1's Trust Network(s), wherein the entries may differ from those that would otherwise fulfill the selection criteria of the user query or request. For instance, the entry set processor 310, based on input (e.g., that U1 and U2 are in the Trust Network in effect) from the relationship manager 304 (either directly, or indirectly such as having pre-computed metadata stored in the entry database 212 or relationship database 214), may identify Offer(T6, S4, U3), Offer(T8, S2, U3), Offer(T10, S3, U3), and Offer(T11, S1, U3) as irrelevant to the request of U1. The search service 206 or entry set processor 212 may then return the following as results to the user or his device: Offer(T9, S1, U1)=$7, Offer(T12, S2, U2)=$5, and Offer(T4, S3, U2)=$6. If the results are to be sorted by time (e.g., most recent first) or price (e.g., lowest price first), then the entry set generator 308 (whose function may also be embedded in or otherwise realized by the search service 206 or the entry set processor 310) may generate the following result list: if sorted by time (most recent first): Offer(T12, S2, U2), Offer(T9, S1, U1), and Offer(T4, S3, U2); if sorted by price (cheapest first): Offer(T12, S2, U2)=$5, Offer(T4, S3, U2)=$6, and Offer (T9, S1, U1)=$7. This scenario is depicted in FIG. 4.

Figure 5:
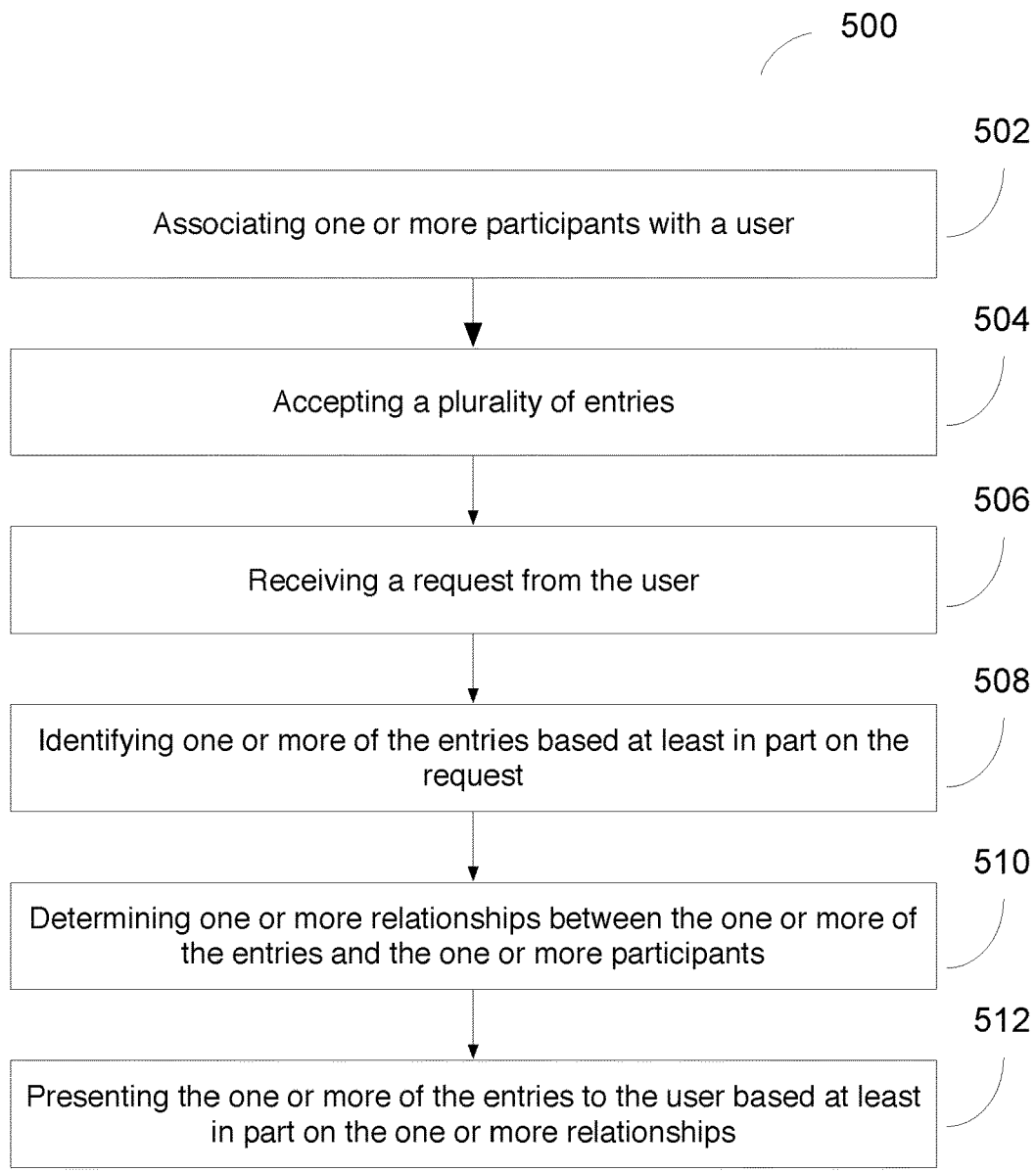
FIG. 5 illustrates a flow diagram of an example process for an embodiment of the present invention.

FIG. 5 shows a flow diagram of an exemplary process 500 for presenting entries to a user based at least in part on relationships between the entries and the user's Trust Network(s). A device or system embodying the present invention or otherwise equipped with the present invention, such as the one shown in FIG. 1, FIG. 2, or FIG. 3, may carry out, implement, or otherwise effect this exemplary process. Per the example process 500, one or more participants (including users and information providers) may be associated with a user in a system (502), where such association may constitute a Trust Network having the user and the one or more participants as members of the Trust Network. For example, the people network manager 302 shown in FIG. 3 may use a list of friends or favorite users or information providers established by the user as the association for creating such a Trust Network for the user in question. Per the example process 500, the system may accept or otherwise retrieve a plurality of entries from one or more participants (504). For example, the entry handler 208 may examine (e.g., by Web crawling) the Web for entries of interest, and store these entries and/or references (e.g., URLs) to these entries, as well as receive submissions from users and other information providers. The identification of sources or submitters of the resulting entries are also recorded, for example, in the entry database 212. Per the example process 500, the system is also capable of receiving a request for information from the user (506), the information comprising one or more entries available in or via the system, and being subject to the Trust Effect setting in relation to the user's Trust Network(s). For example, the user or his device may send a text query via the communications interface 202 to the user interface 204 of the system. The user interface 204 may in turn pass the query to the search service 206. Per the example process 500, the system identifies one or more of the entries available in or via the system in relation to the request (508). For example, the search service 206 may retrieve in the entry database 212 the entries that it considers as relevant to the query based at least in part on the text in the query. Per the example process 500, the system may also determine any relevant relationships between the one or more of the entries and the one or more participants (e.g., in the Trust Network(s) associated with the user) (510), and present the one or more of the entries (or a subset of them) to the user based at least in part on these relevant, applicable or positive relationships (512). For example, the search service 206 may identify in response to a user's request for the top 10 items the 100 most popular items from the entry database 212 among a system or community of users. The relationship manager 304 may determine the relationships between these 100 entries and the Trust Network(s) of the user sending the request. Based on these relationships (e.g., a submission or purchase relationship), the entry set processor 310 may decide 77 out of these 100 item entries are irrelevant to the user's request (e.g., all the other 23 items have either been submitted or purchased by members in the user's Trust Network(s)). The entry set generator 308 may create a new result list of top 10 item entries based on these other 23 item entries in the entry database 212. The search service may then return this result list to the user via the user interface 204. As another example, the search service 206 may identify in response to a user's request for a sorted-by-price list of current offers for a particular item. Without yet having these offer entries sorted by price, the search service 206 may cause the entry set processor 310 to omit or replace any of these current offer entries with one in the entry database 212 containing an older price for the same item and seller, if there is no applicable or relevant relationship between the current offer entry in question and the user's Trust Network, while there is one between the older price offer entry and the Trust Network, the relationship being determined by the relationship manager 304, either prior to or after the user interface 204 receiving the user's request. The entry set generator 308 may sort by price the applicable or relevant offer entries as determined by the entry set processor 310 and provide the corresponding list of offer entries to the user via the search service 206 or user interface 204. A scenario similar to the one in this example is depicted in FIG. 4. In addition, a maximum limit on the size of the initial entry set as determined by the search service 206 in response to a user's request may be set, so that only those entries in the initial entry set are considered by the entry set processor 310 in relation to their relationships with the user's Trust Network. For example, a user may request for a list of seller locations within 100 meters of his current position, with the closest sellers appearing first on the list. If such a maximum limit is set to 50, then only the entries of the 50 closest sellers would be passed to the entry set processor for further processing, even if there are more than 50 sellers within the 100 meter perimeters. A user and/or system may set or otherwise impose such a limit. Furthermore, according to one embodiment, the search service 206 may combine into one the functions or steps of identifying entries in the entry database 212 in response to a user's request, determining relationships between the entries and the user's Trust Network, and presenting to the user one or more of the entries based at least in part on the relationships. For example, the search service 206 may identify the relevant entries based on both the user's request and relationships between the entries in the entry database 212 and the user's Trust Network in a single batch or sequence of operations, or via a single query to the entry database 212 or another database. Data, metadata, or fields for determination of relevancy to a user's request and of relationships between entries and the user's Trust Network(s) may be stored or otherwise made available in the entry database 212 or some other database(s).

It should be appreciated that the specific steps illustrated in FIG. 5 provide a particular method of presenting entries to a user based at least in part on relationships between the entries and the user's Trust Network(s) according to an embodiment of the present invention. Other sequences of steps may also be performed according to alternative embodiments. For instance, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives. For example, the step of accepting a plurality of entries (504) may be omitted or otherwise replaced by a step of crawling an information repository (e.g., the Web) or combined into the step of identifying one or more of the entries based on the request (508). The step of determining one or more relationships between the one or more of the entries and the one or more participants (510) may combine with the step of determining one or more of the entries based on the request (508) so that, for example, only entries that are determined to be associated with the one or more participants would be considered for relevancy to the request. These combined steps may further be enhanced or otherwise modified to take into consideration of the request from the user in relation to the one or more participants, for example, whether these participants have submitted similar requests, and if so, what entries were deemed more preferred to these participants (e.g., that they have bookmarked the entries) in relation to these similar requests. The step of determining one or more relationships between the one or more of the entries and the one or more participants (510) may also comprise determining the degree or level of the relationships and/or whether they are deemed positive, negative, or neutral. The step of presenting one or more of the entries to the user based on the one or more relationships (512) may further comprising considering if a certain set of criteria is met for choosing the one or more of the entries, such as a minimum number of users in a Trust Network having a non-negative relationship with the entries, or for ignoring an entry when someone in a Trust Network has a negative relationship with the entry within the last 60 days. Either the user or system may specify the criteria. And there may be more than one set of criteria, for example, with a Trust Effect score associated with each set.

Figure 6:
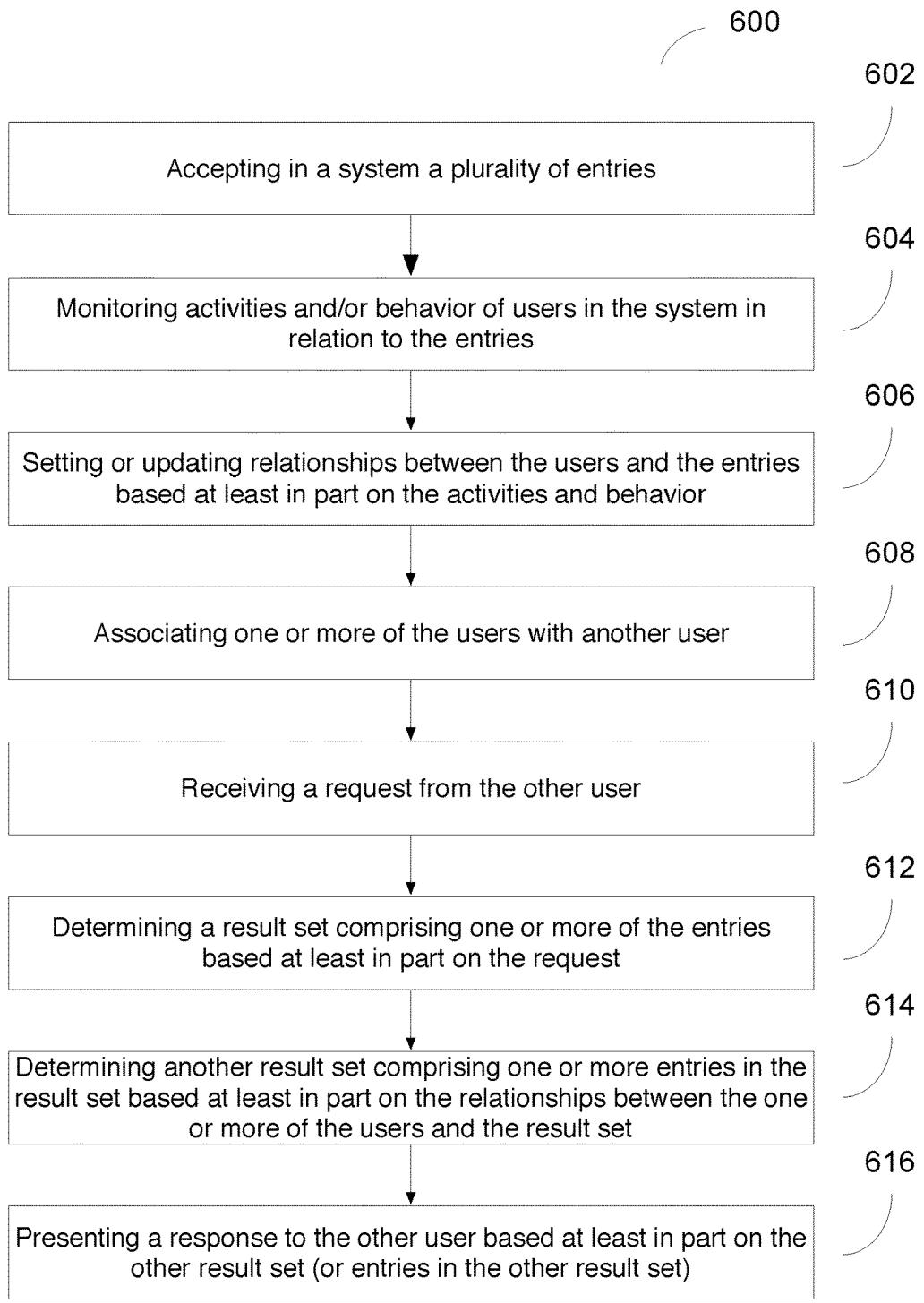
FIG. 6 illustrates a flow diagram of another example process for an embodiment of the present invention.

FIG. 6 shows a flow diagram of an exemplary process 600 that may be implemented, carried out, realized, or otherwise effected by an embodiment of the present invention, such as a search engine, apparatus, component, or system. For instance, per the example process 600, the user interface 204 in a search system comprising the information system 200 and trust effective engine 300 may accept a plurality of entries, the accepting including acquiring URLs from the system's users or administrators, or from within some existing entries in the system, and retrieving webpages as entries based at least in part on the URLs, wherein the retrieving includes crawling and fetching the webpages from the World Wide Web and other digital resources, and indexing them (602). Per the example process 500, the entry handler 208 or search service 206 may monitor activities and/or behavior of the users in relation to entries available in or via the system (604), wherein the activities and/or behavior include the users' selecting or not selecting via the user interface 204 the entries when presented by the search service 206 via the user interface 204, the users' reviewing or rating positively or negatively the entries, the users' incorporating or referencing the entries when creating, submitting, or modifying other entries, the users' bookmarking the entries, and so on. Per the example process 600, the relationship manager 304 may set or update relationships, if any, between the users and the entries based at least in part on the activities and/or behavior, and stores the relationships in the relationship database 214 and/or entry database 212, wherein the relationships include identification of the users (e.g., user IDs), identification of the entries (e.g., URLs), data or metadata relating the users or their activities (e.g., individual queries) to the entries, the data or metadata including a query text, image, an audio input, and so on, and/or a score, rank, flag, marker, indicator, value, a vector of scores, ranks, flags, markers, indicators, or values, or a matrix of scores, ranks, flags, markers, indicators, or values. Per the example process 600, the people network manager 304 may associate one or more of the users with another user (608), for example, when the other user creates a social network or user group to which the one or more of the users are a member, or when the other user marks the one or more of the users as favorite or trusted. Per the example process 600, the user interface 204 may receive a request such as a search request or query from the other user (610), and cause the search service 206 to determine a result set comprising one or more of the entries based at least in part on the request (612), the determining including querying an index of entries stored in the entry database 212 against the request, wherein the result set includes a search result comprising one or more URLs to the entries. Per the example process 600, the entry set processor 310 may determine another result set comprising one or more entries in the result set based at least in part on the relationships, if any, between the one or more of the users and the result set (or entries in the result set) (614), the determining including ranking the relationships (e.g., according to some scores, ratings, or values maintained in or otherwise associated with the relationships) and selecting entries in the result set whose relationships with the one or more of the users have higher scores than other entries in the result set, wherein the other result set includes a set of ranked or ordered URLs and/or images referring to one or more of the entries in the other result set. (According to another embodiment, the search service 206 may determine both the result set and the other result set in a single operation, a sequence of operations, or a multiple sequences of operations.) Per the example process 600, the user interface 204 may present to the other user via the communications interface 202 a response based at least in part on the other result set (or entries in the other result set) (616), wherein the response may include an audio or visual search result list or page of URLs or images (ordered, ranked, or otherwise) referring to a subset of the entries in the other result set. According to some embodiments, participants may opt out or disable (temporarily or otherwise) the associations or relationships between entries and themselves or between a Trust Network and themselves for future activities such as their entry submissions or usage (including but not limited to use of anonymity), or suspend or remove associations or relationships between existing entries and themselves.

It should be appreciated that the specific steps illustrated in FIG. 6 provide a particular method of presenting a response to a user based on his relationship with other users. For instance, the step of accepting a plurality of entries (602) may further receive subject matter information and specification in relation to the plurality of entries, e.g., the search term associated with the URLs (i.e., the plurality of entries) being bookmarked by a user in connection to a research session. The step of accepting a plurality of entries (602), the step of monitoring activities and/or behavior of users in the system in relation to the entries (604), and the step of setting or updating relationships between the users and the entries based on the activities and behavior (606) may take place concurrently and iteratively. For example, a search engine or bookmarking service equipped with the present invention may receive, store, and track URLs bookmarked or saved by each user. One embodiment may allow the user to add ratings or attributes to each bookmarked or saved URL, or create an ordered list of URLs relative to a subject matter of interest. Another embodiment may enable the user to explicitly associate a search session with a set of bookmarks, the search session corresponding to a title or a search term. As individual users create, archive, and abort a search session and its corresponding set of bookmarks, the system may monitor these activities, and establish and maintain relationships among the users, the subject matters or search terms of interest, and the search results that have been bookmarked (and for what and by whom). As part of accepting entries, monitoring activities, and maintaining relationships among users and entries, the system may also determine, periodically or real-time, a popularity or relevancy score for each bookmarked or saved entry against a search term or subject matter of interest.

The step of determining a result set comprising one or more of the entries based on the request (612) and the step of determining another result set comprising one or more entries in the result set based at least in part on the relationships between the one or more of the users and the result set (614) may be combined or otherwise modified so to determine a final set of results based on (a) the request from a user, in its consideration with previously or currently bookmarked results (by other users) deemed relevant (by the other users or the system) to the request; (b) the relationships between the request and the earlier requests from the other users; and/or (c) the relationships between the user and the other users.

For example, upon receiving a search request from a user, the system may determine that the search request or subject matter of interest matches with earlier ones from other users, and identify the common or popular search results or URLs bookmarked, saved, or otherwise identified for these requests. The system may then determine an ordered list of results comprising one or more of these entries, and present the ordered list to the user as part of a response to his search request.

In one embodiment, the system may refine or otherwise generate such an ordered list of results based on the user's relationship with the other users who bookmarked or saved those entries in connection with the similar search requests or subject matters of interest. The user may then select an entry from the ordered list for view or add it to his own set of bookmarks for his current search session (e.g., relative to a subject matter of interest). In one embodiment, this action would contribute to the relationship, popularity, and/or relevancy score for the chosen entry.

In another embodiment, each entry may have multiple relationship, popularity and relevancy scores, one for each subject matter or set of search terms known to be associated with the entry. In addition, the relevancy of a frequently bookmarked or saved entry in connection with a search request could be the same to any user in a group who shares his search results with others in the group, or to any user who has logged on, for example, per some system setup or configuration.

In yet another embodiment, the relevancy of a frequently bookmarked or saved entry in connection with a search request could vary for different users, such as when one user only allows another specific user to access or have visibility to his search results, for example, due to privacy concern. In one embodiment, the system may associate users who bookmarked or saved an entry in relation to a search term, and present a popularity or relevancy score in connection to this association. The system may also present indications of photos or profiles for these users.

A plurality of embodiments are specifically illustrated and/or described herein. However, it will be appreciated that modifications and variations are covered by the above teachings and within the scope of the present invention without departing from the spirit and intended scope thereof. For instance, any type of subject matter in relation to entries is within the scope of various embodiments. For example, a price announcement system may provide price entries for an item at various sellers in various cities. The system may store or reference item entries, seller entries, price entries, city entries, and so on, whose relevancy to a user's request or interest may be enhanced or otherwise determined by a Trust Effect setting. An event or news reporting system may support event or news entries in various cities in different states of a country, or event or news entries about people or celebrities in a group, organization, social network, or region.

An embodiment may also help contextualizing items of interest for a user in an information system that supports query for items. For example, only items submitted, referenced or referred to by members in the user's Trust Network may be included or otherwise given higher relevancy rankings in the results to the user's queries. Hence two different users sending the same query to the system for items may see two different sets of item results, each corresponding to the interests of their respective Trust Networks. And there needs not be a specific subject matter associated with entries in an embodiment. For instance, a general search engine accepts a user's query without any explicit reference to a subject matter or topic. Two entries that may have otherwise been of equal or close rank to a user's query could have one of them being promoted to a distinctively higher rank for relevancy if there is a favorable or positive relationship (e.g., of submission, usage, recommendation) between the entry and the user's Trust Network, while the other entry does not. For example, a user may be given results about Uniform Resource Names (URNs) for his query of "urn", while another user may be given results about urns, a type of vase or vessel, for the same query, because of the previous or historical selections of entries by their respective Trust Networks (or members in their respective Trust Networks) as determined by the search engine equipped with the present invention.

In addition, the impact of Trust Effect on one entry or entry type may affect the relevancy of another entry or entry type in response to a user's query or request. For example, for a user's request for available offers of an item, he may first begin his search for the item in question. If there is no offer entry that satisfies the criteria of Trust Effect for relevancy or inclusion, then an embodiment may suppress or otherwise omit the item entry in its response to the item search request, even though the item search itself may not be subject to Trust Effect per se, or even if the item may otherwise pass the criteria for item relevancy or inclusion.

Another embodiment may, on the other hand, isolate such item search from the impact of a Trust Effect setting enabled for the subsequent offer search, either as a user option or system configuration. Trust Effect on multiple entries or entry types may also be combined, logically or otherwise. For example, when identifying items that may be relevant to a user's search request under the influence of a Trust Effect setting or configuration, an information system may include all items having an applicable or relevant relationship with the user's Trust Network, as well as those available at sellers having an applicable or relevant relationship with his Trust Network. Furthermore, there may be a threshold or criteria for the number of applicable relationships between entries (or their related data or metadata) and a user's Trust Network before the entries in question may be regarded as relevant or selectable for presentation for or to the user. For example, an item entry may be considered relevant under Trust Effect for a user only if more than three distinct members in the user's Trust Network have used the item entry for their entry creation (e.g., of offer entries) or submission or have purchased the item.

According to one embodiment, a Trust Effect setting may always be enabled. According to another embodiment, a user may toggle his Trust Effect setting, and the results will change accordingly without the user initiating the same or another request. According to yet another embodiment, results of entries under an active Trust Effect setting may be presented in addition to those without Trust Effect, with the former assuming higher rankings, or the former and latter arranged in parallel views, or some other arrangements. According to yet another embodiment, Trust Networks for a user or group of users may be established by the system, without any direct relationship between the user or group of users and the members in the Trust Networks. For example, the system may identify according to some criteria the top 10% of its participant base and associate the participant base with or otherwise make available to them a Trust Network comprising these select participants. In one embodiment, a user may also specify a Distrust Network, thereby creating an effective or virtual Trust Network comprising users not in the Distrust Network.

According to another embodiment, the step of associating one or more of the users with another user (608) and/or the step of determining another result set comprising one or more entries in the result set based on the relationships between the one or more of the users and the result set (614) may be omitted or otherwise made optional. For instance, a system equipped with the present invention may accept an entry from a user, and associate it with a subject matter, wherein the subject matter may be defined or specified by the system, the user, or another user. By accepting other entries from other users and associating the entries with their individual submitting users for a common subject matter, the system may determine a set of or an ordered list of most popular entities in connection with those entries for a given subject matter, for example, by the number of submissions, the longevity of the entries' association with the individual users (e.g., the time the entries being on a user's bookmarks for a particular search session), the number of individual submitters or bookmarking users, and so on. The system may then present such a list to a user who may indicate (e.g., via a request to the system) his interest in the subject matter even when the user has never submitted the system any entry in relation to the subject matter.

For example, such a system may accept URL submissions as bookmarking entries for individual users (e.g., after the users have first logged on with the system) in connection with a subject matter (e.g., a retail product or offer, or a query or search term pertaining to a retail product or offer) from Web browsers to which the users are coupled. The subject matter may be specified by the system, or by a user. In one embodiment, the subject matter may be a question (e.g., What is the best microwave oven?) whose user feedback or answers (i.e., user-submitted entries) may each in turn be a subject matter (e.g., How much is this microwave oven and where to get that?). Answers or user-submitted entries to this latter subject matter may be links to the webpages showing the prices of a particular microwave oven, which may be represented by an entry being associated with the former subject matter. Either a subject matter and/or a user-submitted entry may further be qualified by a refining attribute, such as geopolitical location for a subject matter and a language indicator for a submitted URL. A subject matter may also be determined by combining various information types, such as "camera model ABC" and "review", and "camera model ABC" and "price", as in "Where to find the best reviews for the camera model ABC?", and "Where to find the best prices for the camera model ABC?". In one embodiment, the system may support a hierarchy of subject matters, where a system-wide subject matter is predefined, and a subject matter subordinate to or otherwise belonging to the system-wide subject matter may be defined by users. For instance, a search engine system or social network may be declared for or otherwise associated mainly with shopping information or activities. Such a shopping system or network may further provide, for example, two types of contexts for queries: (i) the best product for a particular category, and (ii) the best price for a particular product. The two example contexts may serve as a template for creating user-defined subject matters, such as "the best vacuum cleaner" and "the best price for vacuum cleaner XYZ". In accordance with this approach, users may create and collaborate on various common subject matters of interest all of which belong to shopping. In addition, the system may provide the users with a user interface to browse or search existing questions or subject matters, and create new ones. The users may then associate his search result entries or bookmarking entries with a question or subject matter. For example, the system may accept or use the question or subject matter as, or otherwise associate it with, an initial search or search term for searching the Web or a specific Internet domain or website.

User-submitted entries may or may not comprise a URL. Entities in connection with the user-submitted entries for a given subject matter may include a specific product, service, offer, location, event, server, domain, and so on. The system may enable a user to discover an entry originated by the user or another user, and to associate the entry with himself as a separate submitter or new submission of the entry to the system, for example, against a particular subject matter or one of his research or bookmarking sessions. A user may trigger, for example, via a hypertext link or icon on a webpage a submission of an entry to the system with which the user has already authenticated. An entry may comprise information or attributes that help match or refine a subject matter in question, or generate another subject matter. For example, an entry may include a product name, a brand name, dimensions and weight of the product, and so on. The subject matter in question may have been to find the best product for a particular product category. The brand name information may cause the system to generate or otherwise recognize the subject matter of what is the best product for this brand name for this particular product category. The system may also be able to reduce or otherwise refine the possible results that match users' queries involving attributes related to subject matters, such as location, language, and brand.

In one embodiment, a user-submitted entry may be associated with an entity, where different entries may refer to a common entity. For example, an Internet server or domain name (e.g., www.xvz-abd-149.com) may comprise a plurality of URLs (e.g., www.xvz-abd-149.com/a/b, and www.xvz-abd-149.com/a/c). Each user-submitted entry may comprise a URL identifying a specific webpage on an Internet server or domain. As such, different URLs may map to or otherwise refer to a common Internet server or domain (which may in fact comprise a plurality of computers or servers in deployment). The system may then determine, e.g., continuously, periodically or on demand, which Internet servers or domain names are responsible for or otherwise associated with the most entries for a particular subject matter, and present a set or list of these names or their representations (e.g., an icon such as a favicon) to a user.

For example, a Web browser coupled to the system may display a banner or list of domain names (or favicons, which may be obtained over the Internet), each showing or otherwise being accompanied by the number of past bookmark submissions, and/or the number of current bookmark submissions that refer to the corresponding domain for a given subject matter. The order or ranking of each domain may change or update in real time, periodically, or on demand, as the system monitors and tracks the bookmarking entry submissions in relation to one or more subject matters, or a user-selected or system-selected subject matter. The system may perform such change or update for entries related to an individual user, a group of users, or all users of the system. In one embodiment, the system may also display sponsored domain names next to or otherwise close to such a merit-based list or group of domains. In another embodiment, the system may also display an indication of the popular entities based on the entries submitted by users in relation to a particular subject matter. One advantages of this domain-level discovery feature is that users can discover Internet domains (or herein also referred to as websites) that may specialize in providing certain information.

For example, a popular website for providing retail offers for digital cameras may be different from a popular website for providing reviews for digital cameras. Hence the rankings of websites for the subject matter "Where can I find reviews for digital cameras?" may be different than those for the subject matter "Where can I find the best prices for digital cameras?" In addition, the reputation or expertise of a website so determined enables a user to discover a possible information source for a new entity where there may yet to be an entry submitted to the system for the entity against the website. For example, even though there is no URL ever bookmarked for a particular camera in connection with a popular camera-review site, the fact that the site has been very popular with its URLs being bookmarked for reviews of many other cameras, a user can quickly visit the website and look for review information for that camera. Furthermore, some webpages may have dynamically been generated, so that there is no a static URL one can re-use to reach the same webpage or content. A user may specify the server or domain name in connection with his bookmarking entry, and provide or otherwise associate specific information of interest so that he, another user, or the system may recall the same or equivalent webpage or content based on the information. For instance, a user may include a retail product name in a bookmarking entry, whereby the system may initiate a request to the server based on the product name.

For example, the system may use a Web service interface provided by the domain to conduct the request, or may cause a search engine or service independent of the domain to do so, the search engine or service, for instance, having previously indexed the contents on the domain or the servers associated with the domain. In one embodiment, in response to a query from a user, the system may perform or cause to perform searches against system-determined top domains (e.g., via another system or search service, or the domains' Web services API) for a particular subject matter, the query being associated with the particular subject matter, and the searches being performed in connection with URLs or contents of URLs that comprise the domain names. In one embodiment, the system may provide an interface (e.g., a hypertext link or button) for a user to initiate a search, and if applicable, include a search term with the search, against the top domains, with an option to select or deselect the specific domains, and add addition domains for the search. The search may result in, for example, additional display areas (e.g., UI windows) being shown to the user, with each display area comprising results for each domain, or one display area comprising results for all domains of interest. In one embodiment, a browser coupled to the system and a user may display a banner of icons each representing a system-determined top domain, whereby the user may click on an icon on the banner to visit the domain directly (e.g., on the same browser page, or a new browser tab or window), or interact with that domain alone via the system. The browser may also provide the user a user interface by which the user may have more than one session active, each session corresponding to one subject matter. The user may switch between sessions while submitting entries to the system, thereby associating the entries with one subject matter at a time. The browser may also allow the user to explicitly specify or otherwise identify the subject matter in connection with each entry being submitted to the system.

According to another embodiment, a domain or website of interest may provide, or cause another system or computer to provide, feedback to the system in relation to a specific activity, so that the system may determine a ranking in relation to the activity or based on the frequency or count of the activity. For example, a website or a customer's device may indicate to the system that a user has bought an item at the website. This indication acts as an entry submitted to the system. Depending on the information available at the indication, the entry may be associated with the subject matter of "Where did people buy this item or type of item from?" (if it has location information), and/or the subject matter of "How much did people pay for this item or type of item?" (if it has price information). The system may also generate other statistics of interest based on entries submitted by either users or websites.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated. For instance, method steps described herein may be performed in alternative orders or in parallel. Various embodiments of the invention include logic stored on computer readable media, the logic configured to perform methods of the invention. The examples provided herein are exemplary and are not meant to be exclusive.

For instance, while the present invention has been described in connection with the preferred aspects, as illustrated in the various figures, it is understood that other similar aspects may be used or modifications and additions may be made to the described aspects for performing the same function of the present disclosure without deviating there from. Therefore, the present disclosure should not be limited to any single aspect, but rather construed in breadth and scope in accordance with the appended claims. For example, the various procedures described herein may be implemented with hardware or software, or a combination of both. The invention may be implemented with non-transitory computer-readable storage media and/or computer-readable communication media. Computer programs incorporating various features or aspects of the present invention, or portions thereof, may be encoded on various computer readable media for storage and/or transmission, or take the form of program code (i.e. instructions) embodied in a tangible media; suitable media include magnetic disk or tape, optical storage media such as compact disk (CD) or DVD (digital versatile disk), flash memory, hard drive, and any other machine-readable storage medium. Computer readable media encoded with the program code may be packaged with a compatible device or provided separately from other devices (e.g., via Internet download). Likewise, the invention, or certain aspects or portions thereof, may be embodied in propagated signals, or any other machine-readable communications medium. Where the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only. Thus, although the invention has been described with respect to specific embodiments, it will be appreciated that the invention is intended to cover all modifications and equivalents within the scope of the following claims.

What is claimed:

1. A system, comprising:
   one or more processors; and
   one or more memories communicatively coupled to the one or more processors when the system is operational, the one or more memories bearing computer-readable instructions that, when executed by the one or more processors, cause the system at least to:
   receive a request from a user;
   determine a first collection of digital resources in relation to the request, wherein the first collection of digital resources comprises one or more digital resources;
   determine a second collection of digital resources based on at least a relationship, wherein the relationship exists between a digital resource and a collection of participants, the collection of participants is associated with the user, the collection of participants comprises one or more participants, the second collection of digital resources comprises one or more digital resources, and the digital resource is from among the first collection of digital resources, or the second collection of digital resources, or both the first collection and second collections of digital resources; and
   present a response to a device communicatively coupled to the user, wherein the response comprises at least one digital resource from among the second collection of digital resources, or at least one indication of one or more digital resources from among the second collection of digital resources.

2. The system of claim 1, wherein the first collection of digital resources comprises the digital resource.

3. The system of claim 2, further comprising:
   wherein two or more digital resources from among the first collection of digital resources are each associated with a ranking, and the digital resource is among the two or more digital resources; and
   wherein the response comprises the digital resource, or an indication of the digital resource, the digital resource is associated with another ranking, and the other ranking is lower than the ranking.

4. The system of claim 2, further comprising:
   wherein two or more digital resources from among the first collection of digital resources are each associated with a ranking, and the digital resource is among the two or more digital resources; and
   wherein the response comprises the digital resource, or an indication of the digital resource, the digital resource is associated with another ranking, and the other ranking is higher than the ranking.

5. The system of claim 1, wherein the second collection of digital resources comprises the digital resource.

6. The system of claim 1, wherein an indication of the relationship between the digital resource and the collection of participants, and an indication of the association between the user and the collection of participants are stored in the one or more memories.

7. The system of claim 6, wherein the one or more memories further bear computer-readable instructions that, when executed by the one or more processors, cause the system at least to:
determine that an activity performed by one or more members of the collection of participants is associated with the digital resource; and
store the indication of the relationship between the digital resource and the collection of participants in the one or more memories.

8. The system of claim 7, wherein the one or more memories further bear computer-readable instructions that, when executed by the one or more processors, cause the system at least to:
receive an indication of the collection of participants from the user; and
store the indication of the association between the user and the collection of participants in the one or more memories.

9. The system of claim 7, wherein the second collection of digital resources comprises the digital resource.

10. The system of claim 9, wherein the activity is deemed favorable in relation to the digital resource.

11. The system of claim 7, wherein the second collection of digital resources does not comprise the digital resource.

12. The system of claim 11, wherein the activity is deemed unfavorable in relation to the digital resource.

13. The system of claim 1, wherein the one or more memories further bear computer-readable instructions that, when executed by the one or more processors, cause the system at least to:
determine that a threshold, or one or more criteria, for one or more applicable relationships between the collection of participants and the digital resource are met.

14. The system of claim 1, wherein the one or more memories further bear computer-readable instructions that, when executed by the one or more processors, cause the system at least to:
present another response to the device, wherein the other response comprises at least one digital resource from among the first collection of digital resources, or at least one indication of one or more digital resources from among the first collection of digital resources; and
receive another request.

15. The system of claim 1, further comprising:
wherein the first collection of digital resources comprises an entry, and the entry comprises a value of an attribute to an entity;
wherein the second collection of digital resources comprises another entry, and the other entry comprises another value of the attribute to the entity; and
wherein the response comprises at least an indication of the entity, an indication of the attribute, and an indication of the other value.

16. The system of claim 15, further comprising:
wherein the request is a request for information in relation to the entity; and
wherein the entry is determined to be more relevant than the other entry independently of the relationship, a score associated with the entry being higher than a score associated with the other entry.

17. The system of claim 1, further comprising:
wherein the instructions that, when executed on the system, cause the system at least to determine the second collection of digital resources, further cause the system at least to:
determine the relationship in relation to the user and the collection of participants; and
determine the second collection of digital resources in relation to the relationship.

18. The system of claim 1, further comprising:
wherein the instructions that, when executed on the system, cause the system at least to determine the second collection of digital resources, further cause the system at least to determine the second collection of digital resources in relation to the request and the relationship.

19. One or more non-transitory computer-readable storage media for enabling an online system to provide relevant results to requests, bearing computer-readable instructions that, when executed on a computer system, cause the computer system to perform operations comprising:
receiving a request from a user;
determining a first collection of digital resources in relation to the request, wherein the first collection of digital resources comprises one or more digital resources;
determining a second collection of digital resources based on at least a relationship, wherein the relationship exists between a digital resource and a collection of participants, the collection of participants is associated with the user, the collection of participants comprises one or more participants, the second collection of digital resources comprises one or more digital resources, and the digital resource is from among the first collection of digital resources, or the second collection of digital resources, or both the first collection and second collections of digital resources; and
presenting a response to a device communicatively coupled to the user, wherein the response comprises at least one digital resource from among the second collection of digital resources, or at least one indication of one or more digital resources from among the second collection of digital resources.

20. A computer-implemented method for providing relevant results to online requests, comprising:
receiving a request from a user;
determining a first collection of digital resources in relation to the request, wherein the first collection of digital resources comprises one or more digital resources;
determining a second collection of digital resources based on at least a relationship, wherein the relationship exists between a digital resource and a collection of participants, the collection of participants is associated with the user, the collection of participants comprises one or more participants, the second collection of digital resources comprises one or more digital resources, and the digital resource is from among the first collection of digital resources, or the second collection of digital resources, or both the first collection and second collections of digital resources; and
presenting a response to a device communicatively coupled to the user, wherein the response comprises at least one digital resource from among the second collection of digital resources, or at least one indication of one or more digital resources from among the second collection of digital resources.

* * * * *